United States Patent [19]

Lewis

[11] 3,865,936
[45] Feb. 11, 1975

[54] IN SITU SOIL FUMIGATION FOR COMBATING NEMATODES USING AMINOMETHYLPHOSPHONATES

[75] Inventor: Morton Lewis, Elmhurst, Ill.
[73] Assignee: Swift & Company, Chicago, Ill.
[22] Filed: Nov. 23, 1973
[21] Appl. No.: 418,428

Related U.S. Application Data
[62] Division of Ser. No. 112,786, Feb. 4, 1971, Pat. No. 3,821,335.

[52] U.S. Cl................... 424/211, 424/200, 424/204
[51] Int. Cl............................................... A01n 9/36
[58] Field of Search................... 424/200, 204, 211; 260/945, 932, 944

[56] References Cited
UNITED STATES PATENTS
2,635,112   4/1953   Fields............................. 260/944 X FOREIGN PATENTS OR APPLICATIONS
775,575   1/1968   Canada............................... 260/932

Primary Examiner—Albert T. Meyers
Assistant Examiner—Allen J. Robinson
Attorney, Agent, or Firm—Edward T. McCabe; Charles E. Bouton; Jay C. Langston, Jr.

[57] ABSTRACT

Halogen-containing hydrocarbons are formed by treating certain condensation products with a protolytic agent. The condensation products are halogen-containing materials produced by halogenating the product resulting from the condensation of a primary or secondary amine, an aliphatic acid phosphite and an alpha-beta or beta-gamma unsaturated carbonyl source. The halogen-containing hydrocarbons are useful as fumigants with the volatile ones being especially useful as soil fumigants.

6 Claims, No Drawings

IN SITU SOIL FUMIGATION FOR COMBATING NEMATODES USING AMINOMETHYL PHOSPHONATES

This is a division of application Ser. No. 112,786, filed Feb. 4, 1971, now U.S. Pat. No. 3,821,335.

This invention relates to an in situ method of producing halogen-containing hydrocarbons useful as fumigants and contributes to the plant-growing arts by providing an improved method of fumigating soil. More particularly, the invention concerns novel compositions of matter and a method for confining volatile fumigant materials within the soil for a sufficient length of time to essentially sterilize the soil.

Many of the thousands of organisms that inhabit the soil subsist on living plants. Some injure the roots and other underground parts of the plants and interfere seriously with growth. This problem has been controlled to a certain extent by crop rotation; however, the use of volatile chemcials which function as soil fumigants have become quite common and have been used extensively for the last 30 or more years. Thousands of acres are fumigated annually and the acreage is increasing. Soil fumigation is costly but the increased yield afterwards may have a value very much more than the investment.

Undesirable living things such as bacteria, fungi, nematodes and insects, as well as certain weeds, have been adequately checked by soil fumigation. Of the fumigants in general use, methyl bromide, ethylene dibromide, and 1,2-dibromo-3-chloro propane have been used extensively. Methyl bromide, a highly volatile compound, has a boiling point of about 40° F. In order to inject it into the soil, in the manner that most fumigants are applied, it must be mixed with a diluent having a higher boiling point. Such mixtures have been in use for some years but even with them it is difficult to keep the gas in the soil long enough to obtain the desired results.

Methyl bromide is highly toxic to many kinds of insects, but its use as a soil fumigant has been limited because in most instances a fumigation chamber or tent is required. This newer method however makes it possible to utilize, to a much greater degree, the killing power of methyl bromide. Undiluted methyl bromide is evaporated from shallow pans or trays or introduced by means of plastic tubes into open containers placed on the surface of the soil but under a gas tight cover. The cover is held up a few inches above the soil by supports so that there is a shallow air space between it and the surface of the soil. The edges of the cover are buried so as to give a relatively air tight system. The rate for most purposes of introducing the methyl bromide is about one pound per 100 sq. ft. but larger amounts, up to five pounds per 100 sq. ft. are used to irradicate the more resistant organisms. The cover usually remains in place for 24 to 48 hours, and the seeds can normally be planted 2 to 3 days after the cover is removed. Penetration of the methyl bromide into the soil is surprisingly good under favorable conditions and the chemical has a sterilizing effect down to 12 inches or more.

The gas tight cover used to prevent the vanishing of the methyl bromide usually comprises heavy paper, polyethylene or other gas impermable films and is tightly sealed to prevent the escape of the fumigant. Such temporary, fabricated covers, however, are relatively expensive and may be somewhat awkward and difficult to handle during the fumigating operations. Furthermore, after the fumigation of a given plot of soil has been accomplished the cover must be removed in order to permit any use of the fumigated soil. With such disadvantages being readily apparent, use of methyl bromide as a fumigant is usually restricted to small areas such as seed beds, greenhouses and nursery plots.

Other methods have been devised to keep the volatile fumigant dispensed throughout the soil. One method comprises employing, as a blanket for the soil that is to be fumigated, a covering layer of stable long-lasting foam that has been generated from an aqueous, foam-providing composition. This foam covers the ground and confines the volatile fumigant or other soil-treating substance thereunder. The foam blanket may be applied to the soil prior to fumigation or substantially simultaneously therewith. In this connection, it must be realized that the foam must be such a nature that the ingredients do not adulterate the soil inasmuch as the foam will eventually decay, dissipate and seep into the soil. Removal of the foam after the required length of time is impractical. Here again, however, the use of foams to prevent the liberation of the gaseous fumigant is somewhat limited to small areas and is poorly adapted for outdoor utilization. Furthermore, if it rains, the foam protection will probably be washed away allowing the methyl bromide to dissipate.

In addition, the problem of controlling harmful or unwanted parasites present in the soil, such a nematodes, is one of considerable complexity. In order to be an effective toxicant, the compound must be able to penetrate the normally imprevious outer covering of the worm as well as the enclosing members of the larva and eggs and to interfere with some vital function of the organisms. A compound which is effective must be one that will remain in the soil and have contact with the undesirable organism for a sufficient period of time to effect penetration of the organism and to destroy it by one means or another. In order to get a complete treatment of the soil, gaseous reactants instead of liquid reactants must be utilized so as to get adequate dispersibility.

It is therefore one subject of this invention to provide a method for fumigating soil wherein coverings and complicated equipment are not required.

It is another object of this invention to provide a means for fumigating large areas of soil at one time rather than fumigating small parts in successive time intervals.

It is another object of this invention to provide a controlled method of fumigating the soil by liberating methyl bromide or other toxicants in increments over a period of time.

Other advantages not specifically set forth herein will be readily apparent to those skilled in the art upon a reading of the detailed description of the invention which follows.

In general, this invention relates to a method of forming a soil fumigant in situ and comprises the protolytic treatment of a halogen-containing ingredient so as to slowly liberate a volatile halogen-containing hydrocarbon which, as it dissipates through the soil, will sterilize the same. As is well known, moisture is present in the soil and this moisture is used to react with the halogenated condensation products so as to give volatile halogen-containing hydrocarbons.

Briefly, the condensation products used in this invention, to be reacted with water to form the volatile alkyl halides, are produced by a condensation reaction of a primary or secondary amine, an aliphatic acid phosphite and an alpha- beta or beta-gamma unsaturated carbonyl source which is usually a ketone or aldehyde. This condensation reaction is normally exothermic and hence, the reaction system is cooled until the reaction is complete. The product resulting from this condensation contains unsaturation which was carried over from the alpha-beta or beta-gamma position of the carbonyl compound. Halogenation of this product results in a halogenated composition having halogen atoms in such a position that an intramolecular cyclic reaction can take place between the phosphorus oxygen bearing the alkyl group and the carbon atom bearing the halogen. The result is that an alkyl halide is liberated and dissipates throughout the soil.

During the condensation reaction, water is split out but does not present hydrolysis problems in regard to the phosphonic ester. The product is separated from the water however and essentially dried prior to the halogenation reaction.

In detail as to the specific reactants, the amine reactant may be designated as either a primary or secondary amine of 1 – 30 carbons, being either saturated or unsaturated, branched or straight chained and either unsubstituted or substituted with non-interfering groups. One group of amines, which are quite useful inasmuch as they are relatively inexpensive, includes the lower alkylamines such as dimethylamine, diethylamine, dipropylamine, dibutylamine, as well as the corresponding mixed amines such as methylethylamine, methylbutylamine, ethylpropylamine and primary amines such as propylamine, butylamine, octylamine, etc. At this point, it is appropriate to point out that while an alkyl halide is liberated, the basic carrier material, i.e., that part of the molecule containing nitrogen (from the amine used) remains in the soil and is available to the plant as food. In addition, the phosphorous from the phosphite also remains and may act as a nutrient of growing crops.

Another class of useful amines is the saturated and unsaturated primary or secondary higher fatty amines such as oleylamine, ricinoleylamine, erucylamine, linoleylamine, linolenylamine, and clupanodonlyamine, dicoco amine, disoya amine and hydrogenated tallow amine, produced from the corresponding fatty acids as well as the more synthetic amines of 3 – 18 carbons such as propyleneamine, hexyleneamine, decyleneamine.

Another group of useful amines comprises the primary and secondary alkylamines which may contain mixed alkylol radicals or alkyl and alkylol radicals. Suitable alkylolamines include ethanolamine, propanolamine isopropanolamine, butanolamine, hexanolamine, diethanolamine, dipropanolamine, dibutanolamine, tris(hydroxymethyl) aminomethane, etc. Mixed alkylolamines such as 2-hydroxyethyl propanolamine, 2-hydroxypropy; butanolamine can be used as well as the alkylalkanolamines.

Dialkyl and dialkenyl phosphites which are suitable include the phosphites wherein the alkoxy radical contains about 1 – 8 carbons, usually 1 – 4 carbons and include dimethyl phosphite, diethyl phosphite, dipropyl phosphite, dibutyl phosphite, diamyl phosphite, dihexyl phosphite, diheptyl phosphite, dioctyl phosphite, and isomers thereof, as well as methyl ethyl phosphite, ethylbutyl phosphite, etc. Halogenated dialkyl phosphite can be used, and indeed are preferred in some instances. Representatives of this class of reactants include di-(beta-chloroethyl) phosphite, di-(beta-fluoroethyl) phosphite, di-(beta-bromoethyl) phosphite, di-(2,3dichloropropyl) phosphite, di-(2,3-dibromopropyl) phosphite, etc. In general, the halogenated dialkyl phosphites will contain about 1 – 5 carbons per alkoxy group along with 1 –4 halogen atoms per radical.

The carbonyl source reactant is an aldehyde or ketone and may be represented by the formula:

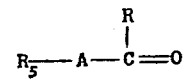

wherein A is

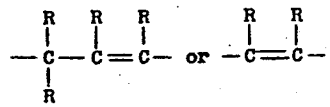

and R is the same or different and is hydrogen, alkyl, alkenyl, alkynyl, arylalkyl and alkylaryl, either straight or branched chained radicals of 1 – 20 carbons which may be substituted with hydroxyl and or halo groups or other non-interfering substituents. In preferred compounds, R is either hydrogen or a lower alkyl group. $R_5$ is hydrogen a straight or branched chained alkyl, aryl, alkenyl, alkynyl, or alkylary; or arylalkyl group of 1 – 20 carbon atoms which also may be substituted with non-interfering substituents.

The following general reaction equation is illustrative of the preparation of the esters which are subsequently halogenated.

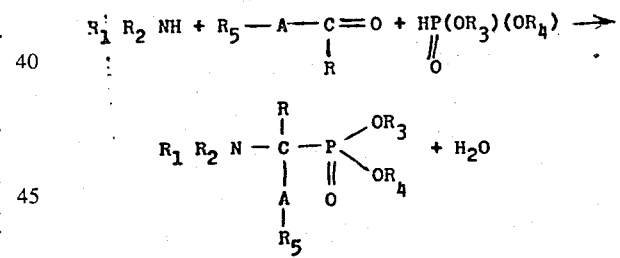

As can be seen from the above reaction, water is split out and should be removed prior to the halogenation reaction inasmuch as the resulting halogenated compounds decompose in the presence of moisture.

Since the water must be removed before the halogenation step, this can most easily be accomplished by distillation or co-distillation with the reaction solvent. Other methods of removing water known to those skilled in the art such as the use of molecular sieves or desiccants can also be used under the right conditions. The product can be dissolved in a suitable solvent and dried with anhydrous sodium sulfate, magnesium sulfate, calcium chloride, calcium sulfate, etc. Co-distillation with benzene or toluene can also be used to remove the water both at atmospheric pressure or under reduced pressure when the products are soluble in these solvents.

The unsaturated phosphonic ester may be halogenated with bromine, chlorine, iodine, BrCl, HOBr, etc.

to give a polyhalogenated substance. The addition of the halogen should be conducted at rather low temperatures to aviod decomposition or secondary reactions of the phosphorous-containing product. Thus, during addition of the halogen, the reaction mixture temperature should preferably be kept below about 25° C. After the addition of the halogen is complete, the reaction mixture may be warmed to a somewhat higher temperature, preferably not exceeding about 60° C. to insure complete at halogenation.

In many cases it may be found best to maintain the reaction at lower temperatures, i.e., in the range of from about −10° C. to about 20° C. during the addition of the halogen and then warm the mixture to a higher temperature to insure complete reaction. Particular suitable solvents for the halogenation step include diethylene glycol dimethyl ether, diethyl ether, cellosolve acetate, benzene, methyl carbitol, toluene, hexane, tetrahydrofurane, dioxane, or any other non-protolytic solvent that will dissolve the reactants and itself not be attacked by the halogen or react in the system.

The following generic formula defines the halogen-containing compositions that liberate halogen-containing hydrocarbons upon treatment with a protolytic agent and hence that are useful in carrying out the various methods of this invention.

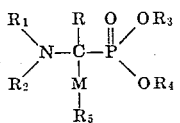

wherein R, $R_1$, and $R_2$ are the same or different and can be hydrogen, or a straight or branched chained alkyl, alkenyl, alkynyl or a alkylaryl group of 1 – 30 carbons which may contain non-interfering groups; $R_1$ and $R_2$ may be part of a cyclic system, and $R_1$ may be

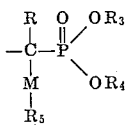

$R_3$ and $R_4$ are alkyl, alkenyl, or alkynyl groups, or halogenated alkyl groups of from about 1 – 8 carbons; and $R_5$ is hydrogen, or a straight or branched chained alkyl, aryl, or alkylaryl group of 1 – 20 carbons which may contain non-interfering groups. M is either $-CH_2CHXCHX-$ or $-CHXCHX-$ where X is halogen or hydroxy with the provision that at least 50% of the X's are halogen. The $R_3$ or $R_4$ group in the presence of moisture interacts with the X contained in the A group to form $R_6X$ where $R_6$ is $R_3$ or $R_4$.

if the chemical reaction described above is carried out with any alpha-beta or beta-gamma unsaturated carbonyl source, the product when subsequently halogenated will slowly liberate an alkyl halide. In this connection, if the alkoxy group on the phosphite contains halogen the liberated reactant will contain multiple halogen atoms. Hence, by careful selection of the particular acid phosphite used in the reaction, materials such as methyl bromide, ethylene dibromide, ethylene dichloride, dichloropropene, 1,2,3-trichloropropane, 1,2,3-tribromopropane, 1,2-dibromo-3-chloropropane, allyl bromide, propargyl bromide and other halogenated hydrocarbons can be formed which will diffuse through the soil.

The rate at which the aliphatic hydrocarbon halide is liberated depends upon the protolytic nature of the solvent system. The more protolytic the solvent, the more rapid the liberation of hydrocarbon halide. Therefore, the product of a short chained alkyl and dimethyl hydrogen phosphite with crotonaldehyde and subsequent bromination in a less protolytic solvent such as benzene, tetrahydrofurane, dioxane or cellosolve acetate will produce a material useful as a soil fumigant and also as a fertilizer. The material is applied while tilling or plowing the soil, either as a liquid product in a solvent such as tetrahydrofurane, dioxane or cellosolve acetate or may de deposited on an inert carrier or solid fertilizer and applied in this manner. Generally speaking, a sufficient amount of chemical is added to the ground so as to librate 1 – 4 pounds of methyl bromide per 100 sq. ft. The amounts of ingredients used will be readily apparent to one skilled in the art depending upon the organisms to be killed, and the desired fumigant, i.e., methyl bromide, 1,2-dibromo-3-chloropropane, etc.

In the presence of soil moisture, a halogenated alkyl is liberated. When the halogenated-containing phosphoric ester contains methoxy groups attached to the phosphorus atom and bromine at the appropriate alpha-beta or beta-gamma positions in reference to the carbon atom adjacent to the phosphorous atom, methyl bromide is slowly liberated when the ester comes in contact with moisture. Very little is usually lost to the atmosphere on application. The residue material in the soil is available as sources of nitrogen and phosphorous for growing crops. Therefore, the residue can act as a fertilizer supplement and is not lost or of a valueless nature.

The following Examples are set forth as illustrative embodiments of the invention and are not to be taken in any manner as limiting the scope of the invention.

EXAMPLE I

To a rapidly stirring mixture of 30.3 g. (0.3 mole) dipropylamine and 33 g. of dimethyl phosphite (0.3 mole) in a 500 ml., three-neck round bottom flask equipped with a motor driven stirrer, reflux condenser, and thermometer, was slowly added 21.0 g. of crotonaldehyde (0.3 mole). The exothermic reaction was controlled with an external water bath so that the temperature was held at about 70° C. After all the crotonaldehyde was added and the initial exotherm was over, the reaction mixture was heated by means of a temperature controlled glascol heating mantle at 70°–75° C. for about 1 hour. The product was homogeneous, and it was cooled to room temperature and taken up in a 100 g. diglyme (diethylene glycol dimethyl ether). A small quantity of anhydrous sodium sulfate was added to remove the water formed in the reaction. The dried product was filtered into another 500 ml., three-neck round bottom flask equipped with a motor driven stirrer, a thermometer, and a dropping funnel with a pressure compensating side arm filled with 24 g. (0.3 mole) of bromine. The reaction mixture was cooled to about 10° C. and the bromine addition started. The temperature was maintained between 10°–15° C. throughout. When all the bromine had been added, the temperature was slowly raised to about 50° C. for 30 minutes. The final product was a clear dark yellow solution. A small sample was added to water, and it began to decompose rapidly giving off a colorless gas which proved to be methyl bromide.

EXAMPLE II

To a rapidly stirred mixture of 36.6 grams of tris(hydroxymethyl) amino methane (0.3 mole) and 33 grams of dimethyl phosphite (0.3 mole) in a 500 ml 3-neck round bottom flask equipped with a motor driven stirrer, reflux condenser, and thermometer, was added 21.0 grams of crotonaldehyde (0.3 mole). There was an immediate exothermic reaction. After 20 minutes, external heat was applied by means of a glass-col heating mantle for an additional 40 minutes. The product was homogeneous and was cooled to room temperature. Methyl carbitol (67 grams) was added as a solvent and the reaction flask was cooled with an external ice bath while 48 grams (0.6 mole) of bromine was slowly added by means of a dropping funnel. The final product was a dark yellow clear solution which decomposed very slowly on standing at room temperature giving off methyl bromide due to the small amount of water present from the original condensation reaction and the somewhat protolytic nature of the solvent. A sample was taken and added to water where the decomposition was very rapid.

EXAMPLE III

To a rapidly stirring mixture of 36.5 g. (0.5 mole) diethylamine and 148 g. (0.5 mole) di-(beta-bromoethyl) phosphite in a 500 ml. three-neck round bottom flask equipped as in Example I was added 66 g. cinnamaldehyde (0.5 mole) slowly through a dropping funnel. The exothermic reaction was controlled at the reflux temperature of diethylamine (55° C.). Heat was applied after the exotherm had subsided in order to maintain the temperature at 55°–60° C. for at least an hour after all reflux had subsided. Tetrahydrofuran (100 g.) that had been previously dried and distilled was then added and the solution dried over anhydrous sodium sulfate to remove the water formed on reaction. The solution was then filtered into another three-neck flask and 80 g. bromine was added as outlined in Example I. The final product was a clear very dark yellow solution. A small sample was mixed with water and allowed to stand about 10 minutes. A gas chromotographic analysis was then run showing the formation of a peak identifiable as ethylene dibromide.

EXAMPLE IV

The condensation of 61 g. (0.5 mole) benzylmethylamine and 241 g. (0.5 mole) di(2,3-dibromopropyl) phosphite (made by bromination of diallyl phosphite) with 49 g. (0.5 mole) trans-2-hexenal was carried out as desired in Example I. The product was dissolved in dioxane and dried over sodium sulfate. The dried solution was then chlorinated by bubbling chlorine gas slowly into the dioxane solution until the theoretical amount of chlorine had been taken up, and there was a corresponding increase in the weight of the reaction mass. A small sample of the chlorinated product was mixed with water for about 10 –15 minutes and then injected into the gas chromotograph. There was a peak that could be attributed to the known nematocidal compound 1,2-dibromo-3-chloro-propane.

EXAMPLE V propylamine (60 g., 0.5 mole) and di(2,3-dibromopropyl) phosphite (482 g., 1 mole) were condensed with 304 g. of citral (3,7dimethyl-2,6-octadienal) by the procedures outlined in Example I. The reaction product was taken up in dioxane and dried with sodium sulfate in order to remove the water formed by the reaction. The dioxane solution was then chlorinated using chlorine gas until the increase in weight of the reaction mass was the theoretical increase for all the residual unsaturation. A sample of the chlorinated product in dioxane was mixed with water for about 15 minutes. It was possible to identify 1,2-dibromo-3-chloropropane by gas chromatography in the water mixture.

EXAMPLE VI

Dicocoamine (195 g.) and di(beta-bromoethyl) phosphite (148 g.) were heated together at about 110° C. to get them fluid and homogeneous. Methyl vinyl ketone (35 g.) was then added very slowly through a dropping funnel controlling the temperature by means of external cooling. Care should be exercised during this exothermic reaction. After all the ketone had been added, the temperature was maintained just high enough to keep the reaction mass fluid and for about 30 minutes. Benzene was then added and the water of reaction was co-distilled from the product under slight reduced pressure. The reaction product was then brominated (80 g. bromine). The final brominated product when mixed with water produced exthylene dibromide which was identifiable by gas chromatography.

EXAMPLE VII

Diallylamine (48 g.) and dimethyl phosphite (55 g.) were reacted with 66 g. cinnamaldehyde by the procedures outlined in Example I. Bromination of the reaction product required 240 g. bromine because of the unsaturation on the amine. When mixing the brominated product with water, gas evolution was noted. The gas was methyl bromide.

EXAMPLE VIII

Butylamine (18.5 g., 0.25 mole) and dimethyl phosphite (55 g., 0.5 mole) were mixed together and reacted with 28 g. (0.5 mole) acrolein as outlined in Example I. Care should be exercised on the addition of the acrolein. The product was taken up in tetrahydrofuran and dried over sodium sulfate. The dried product was brominated with 80 g. bromine The same product was made using 108 g. dibromopropanal (acrolein dibromide) as the aldehyde source. When the brominated product was mixed with water methyl bromide gas was evolved.

EXAMPLE IX

Dibutylamine (65 g., 0.5 mole) and diallyphosphite (81 g., 0.5 mole) were mixed together and reacted with 35 g. (0.5 mole) crotonaldehyde as outlined in Example I. The dried dioxane solution was brominated with 240 g. bromine. When the brominated product was mixed with water, 1,2,3-tribromopropane could be detected by gas chromatorgraphy. Chlorination with 106.5 g. chlorine instead of bromination produced 1,2,3-trichloropropane.

The products of this invention can be applied to the soil as liquids in solution. However for some applications, particularly in lawn and garden applications, a solid material may be preferable. To this end the liquid product can be absorbed on a solid material like expanded vermiculite or pelletized fertilizer. Expanded vermiculite, for example, can be mixed with the products of this invention, and the solvent can be removed by drying the vermiculite in a forced draft oven or, in the case of high boiling solvents, in a vacuum oven. When the vermiculite which now has the products absorbed onto it is mixed with soil, the moisture in the soil and that added on watering the soil, will allow the secondary reaction to take place forming the active fumigant agents. The soil to be treated should be thoroughly mixed with the solid absorbent for good contact between soil and absorbent before watering.

Obviously many modifications and variations of the invention as hereinbefore set forth may be made without departing from the spirit and scope thereof, and therefore, only such limitations should be imposed as are indicated in the appended claims.

I claim:

1. A method of combating nematodes by fumigating the soil which comprises incorporating into the soil a nematocidally toxic amount of a compound of the formula:

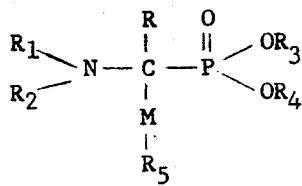

wherein R, $R_1$, and $R_2$ are the same or different and are hydrogen or a straight or branched chained alkyl group of 1 – 30 carbons which may contain non-interfering groups; and $R_1$ may be

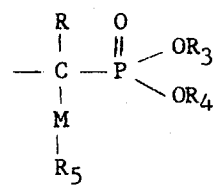

$R_3$ and $R_4$ are alkyl or halogenated alkyl groups of from about 1 – 8 carbons; and $R_5$ is hydrogen, or a straight or branched chained alkyl, or alkylaryl group of 1 – 20 carbons which may contain non-interfering groups and M is a member selected from the group consisting of —$CH_2CHXCHX$— and —$CHXCHX$— where X is halogen such that, when contacted with sufficient moisture, and intramolecular cyclic reaction will take place between the phosphorus oxygen atom bearing the $R_3$ or $R_4$ group and the carbon atom bearing one of the halogens resulting in the liberation of an alkyl halide fumigant.

2. The method of claim 1 wherein R, $R_1$ and $R_2$ are hydrogen or lower alkyl, $R_3$ is lower alkyl or lower halogenated alkyl and $R_4$ is hydrogen, lower alkyl or lower halogenated alkyl.

3. The method of claim 1 wherein $R_5$ is methyl.

4. The method of claim 1 wherein $R_3$ and $R_4$ are methyl.

5. The method of claim 1 wherein $R_3$ and $R_4$ are a member selected from the group consisting of 2,3-dichloropropyl and 2,3-dibromopropyl.

6. The method of claim 1 wherein $R_1$, $R_2$, $R_3$, $R_4$, and $R_5$ are lower alkyl radicals of 1 – 4 carbons and R is either lower alkyl or hydrogen.

* * * * *